(12) United States Patent
Green

(10) Patent No.: US 8,639,100 B2
(45) Date of Patent: Jan. 28, 2014

(54) ACCELERATED ACCESS TO FRAMES FROM A COMPRESSED DIGITAL VIDEO STREAM WITHOUT KEYFRAMES

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1382 days.

(21) Appl. No.: 11/968,014

(22) Filed: Dec. 31, 2007

(65) Prior Publication Data

US 2008/0101772 A1    May 1, 2008

Related U.S. Application Data

(62) Division of application No. 10/227,573, filed on Aug. 22, 2002, now Pat. No. 7,418,190.

(51) Int. Cl.
*H04N 5/93* (2006.01)
*H04N 5/917* (2006.01)

(52) U.S. Cl.
USPC ........... 386/354; 386/355; 386/356; 386/348; 386/345; 375/341; 714/795

(58) Field of Classification Search
USPC .......... 386/354, 355–356, 348, 345; 375/341; 714/795
See application file for complete search history.

(56) References Cited

U.S. PATENT DOCUMENTS

| | | | |
|---|---|---|---|
| 4,626,828 A | 12/1986 | Nishitani | |
| 4,691,253 A | 9/1987 | Silver | |
| 4,751,588 A | 6/1988 | Tsujimura | |
| 4,819,059 A | 4/1989 | Pape | |
| 5,262,871 A * | 11/1993 | Wilder et al. | 348/307 |
| 5,818,547 A | 10/1998 | Ozaki | |
| 5,991,515 A * | 11/1999 | Fall et al. | 358/1.15 |
| 6,278,466 B1 * | 8/2001 | Chen | 345/473 |
| 6,980,732 B1 | 12/2005 | Suzuki | |
| 7,171,594 B2 | 1/2007 | Wyatt et al. | |
| 7,177,278 B2 * | 2/2007 | LeBlanc | 370/235 |
| 7,418,190 B2 | 8/2008 | Green | |
| 7,577,333 B2 * | 8/2009 | Chung et al. | 386/248 |
| 2002/0034374 A1 | 3/2002 | Barton | |
| 2003/0147479 A1 * | 8/2003 | Shah et al. | 375/341 |

(Continued)

OTHER PUBLICATIONS

Office Action for U.S. Appl. 11/967,949, mailed on Mar. 1, 2012, Dustin Green, "Accelerated Access to Frames from a Compressed Digital Video Stream without Keyframes", 7 pgs.

(Continued)

*Primary Examiner* — Helen Shibru
(74) *Attorney, Agent, or Firm* — Lee & Hayes, PLLC

(57) ABSTRACT

A digital video recorder stores digital video streams having sequences of encoded frames that are predominantly non-keyframes. The digital video recorder synthesizes keyframes for the digital video stream by decoding the frames in sequence and occasionally capturing the state of the decoder as it decodes the frames. The decoder states are stored in a state index in association with the frames. During playback at normal or accelerated speeds, the digital video recorder is capable of random accelerated access of any frame in the digital video stream. A decoder state associated with the accessed frame is retrieved from the state index and used to begin decoding at or near the accessed frame. The decoder state initializes a playback decoder to the state that enables complete decoding and rendering of the accessed frame without having to decode multiple frames previous to the accessed frame, thereby minimizing time delays in playback.

12 Claims, 11 Drawing Sheets

(56) References Cited

U.S. PATENT DOCUMENTS

| | | |
|---|---|---|
| 2003/0152363 A1* | 8/2003 | Jeannin et al. .................. 386/68 |
| 2003/0165326 A1 | 9/2003 | Blair et al. |
| 2004/0247296 A1 | 12/2004 | Nakatani et al. |
| 2004/0264925 A1 | 12/2004 | Harumoto et al. |
| 2006/0056516 A1 | 3/2006 | Hamamatsu et al. |
| 2011/0267544 A1* | 11/2011 | Mei et al. ...................... 348/700 |

OTHER PUBLICATIONS

Office action for U.S. Appl. No. 11/967,949, mailed on Nov. 2, 2012, Green, "Accelerated Access to Frames from a Compressed Digital Video Stream without Keyframes ", 13 pages.

* cited by examiner

ACCELERATED ACCESS TO FRAMES FROM A COMPRESSED DIGITAL VIDEO STREAM WITHOUT KEYFRAMES

RELATED APPLICATIONS

This non-provisional U.S. patent application is a divisional of and claims the benefit of priority to U.S. patent application Ser. No. 10/227,573, filed on Aug. 22, 2002, the disclosure of which is incorporated by reference herein.

TECHNICAL FIELD

This invention relates to devices that handle digital video streams, such as digital video recorders. More particularly, this invention relates to techniques for recording and playing back digital video streams that have limited or no keyframes.

BACKGROUND

A digital video stream is composed of a sequence of individual frames. Typically, the video stream has periodic keyframes. Each keyframe contains sufficient data to enable decoding and rendering of a complete image. In the MPEG standard, an intra-frame is an example of a keyframe. To reduce the amount of data transmitted or stored, the digital video stream also typically includes non-keyframes that contain less information than is needed to decode and render a complete image. Non-keyframes are commonly inserted between keyframes and may contain, for example, information describing the motion of objects in the rendered images. In the MPEG standard, an inter-frame (e.g., P-frame or B-frame) is an example of a non-keyframe. A full image cannot be generated from a non-keyframe without first decoding a keyframe or multiple preceding non-keyframes in the video stream.

FIG. 1 illustrates a conventional compressed digital video stream 100 that includes a number of frames in sequence. Video stream 100 includes only non-keyframes (e.g., inter-frames). Video stream 100 has no keyframes (e.g., intra-frames). Video stream 100 is played by decoding the frames in their decode order and rendering the frames in their display order. To play a particular frame, a number of previous frames are first decoded to enable decoding and rendering of a completely specified image at the particular frame. The number of preceding frames used to decode the particular frame is determined by the video encoding format (e.g., MPEG 2, MPEG 4, H.26L, etc.) and the implementation of the encoder. For example, to decode and render non-keyframe 21 (referenced as frame 102 in FIG. 1) which resides in a digital video stream encoded using the MPEG 2 standard, a decoder may need to decode the preceding twenty non-keyframes 1-20 (are referenced generally as 104 in FIG. 1).

Playing back video streams with predominantly non-keyframes thus poses a problem in that a large number of preceding frames must first be decoded before presentation of the desired frame. This results in an inconvenient time delay for a user who is waiting the view the recorded video stream.

A more challenging scenario is to play the video stream 100 at an accelerated speed, such as fast forward or fast reverse. To play a digital video stream in an accelerated fast forward or fast reverse, a conventional recorder normally renders only the keyframes. All non-keyframes are skipped over. Unfortunately, for a digital video stream with limited or no keyframes, such as video stream 100, accelerated playback beginning at a selected frame in the stream is difficult because there are no nearby previous keyframes from which a complete image can be readily derived. Instead, each time the digital video recorder wants to render a selected non-keyframe, it must first decode a large number of preceding non-keyframes.

For example, to render non-keyframe 21 in stream 100 at an accelerated speed, a position pointer is placed back in the stream to enable decoding of many frames previous to the desired non-keyframe 21. In our example, the pointer may be placed as far back as non-keyframe 1 and then the non-keyframes 1-20 are decoded in a sequential forward order to yield a completely specified decoded frame for the non-keyframe 21.

This accelerated playback involves a great amount of decoding resources to render images in the fast forward or fast reverse modes of operation. In some cases, accelerated playback at a desired frame-rate may be impossible because the device playing the stream does not have sufficient resources to decode the necessary non-keyframes at the desired frame-rate. Furthermore, decoding the large number of preceding frames in order to render the necessary non-keyframes results in a noticeable time delay between displayed frames. In some cases, this time delay can be so great that it diminishes the effectiveness of a fast forward or fast reverse operation, which is supposed to be performed at a fast frame rate. At the very least, the delay can be annoying to the viewer.

FIG. 2 illustrates a conventional digital video recorder 200, which may be used to decode digital video stream 100. The digital video recorder 200 includes a source 202 that provides the compressed digital video stream 100 to a store 204, where the stream is recorded for playback at a later time.

A reader 206 retrieves individual frames of the video stream 100 from the store 204 and forwards them to a decoder 208. The video stream 100 is read from the store 204 in a manner that streams the frames sequentially to the decoder 208 as if they were being provided from the source 202 in normal real-time play. The decoder 208 decodes the frames and forwards the decoded frames to a renderer 210 for rendering and display to a user. The decoding process typically involves decompression, and hence decoders are also known as "decompressors".

When the video recorder 200 is requested to access and decode a particular frame in the stream 100, the reader 206 retrieves the frames preceding the particular frame from the store 204 and decodes those preceding frames at the decoder 208. Initially, the decompressed video frames produced by the decoder 208 are incomplete because the first decompressed video frames also rely on data from preceding frames. The first few decompressed video frames rely on an associated state of the decoder that would have been built up in the decoder 208 had the decoder been decoding the frames in sequential order. But, by the time the decoder reaches the intended frame, the decoder state is properly built up to enable full decoding of the particular frame that results in a completely specified image. Unfortunately, this delay in playback may be disruptive to the viewer as he/she is forced to wait for the decoding of preceding frames before a renderable image is produced. Further, in accelerated playback modes, the conventional recorder 200 may not even be able to decode all of the preceding frames in time to render the particular frame at the desired frame-rate.

Accordingly, there is a need for improved decoder techniques that allow rendering of a video stream starting at a randomly accessed non-keyframe without the time delays resulting from decoding frames previous to the non-keyframe at the time of playing back the video stream.

SUMMARY

A digital video recorder stores digital video streams having sequences of encoded frames that are predominantly non-keyframes. The digital video recorder synthesizes keyframes for the digital video stream to enable prompt playback starting at any randomly accessed frame of the recorded digital video stream which has an associated synthesized keyframe. Synthesized keyframes are generated by decoding the frames in sequence as the video stream is initially recorded and occasionally capturing the state of the decoder as it decodes the frames. The synthesized keyframes can also be generated by decoding the frames in sequence after the frames have been recorded and occasionally capturing the state of the decoder as it decodes the frames. The decoder states are stored in a state index in association with the frames.

During playback at normal or accelerated speeds, the digital video recorder is capable of random accelerated access to any frame in the digital video stream that is requested as a starting frame. When a target frame is requested, a decoder state associated with the target frame or a nearby prior frame is retrieved from the state index and used to begin decoding at or near the target frame in the digital video stream. The decoder state effectively initializes a playback decoder to begin decoding at or near the target frame without having to decode a large number of frames preceding the target frame. In this way, the target frame is promptly decoded and rendered for viewing, without significant time delays.

BRIEF DESCRIPTION OF THE DRAWINGS

The same numbers are used throughout the drawings to reference like features and components.

DETAILED DESCRIPTION

A digital video recorder stores digital video streams for later playback at times that are convenient for the viewer. The following discussion pertains to a digital video recorder that enables prompt and efficient playback of digital video streams that are composed exclusively or primarily of non-keyframes, meaning that the streams have either no keyframes or relatively few keyframes. The recorder facilitates accelerated random access to particular decompressed frames without having to first decode large sequences of frames preceding the desired frames.

As used herein, keyframes are frames that contain sufficient data to render a complete digital image. In MPEG 2, for example, intra-frames or I-frames can be classified as keyframes. Conversely, non-keyframes are frames that contain less than sufficient data needed to fully render a complete digital image. Non-keyframes might contain motion data or other information that may be used to render a complete image given one or more preceding frames. In MPEG 2, for example, inter-frames such as predicated or P-frames can be classified as non-keyframes.

The techniques described herein may be used with many digital video coding formats, including MPEG 2, MPEG 4, H.26L, and so on. In some examples, the MPEG 2 format is described for discussion purposes; however, the techniques are not limited to this specific format.

Exemplary Digital Video Recorder

Figure 1:
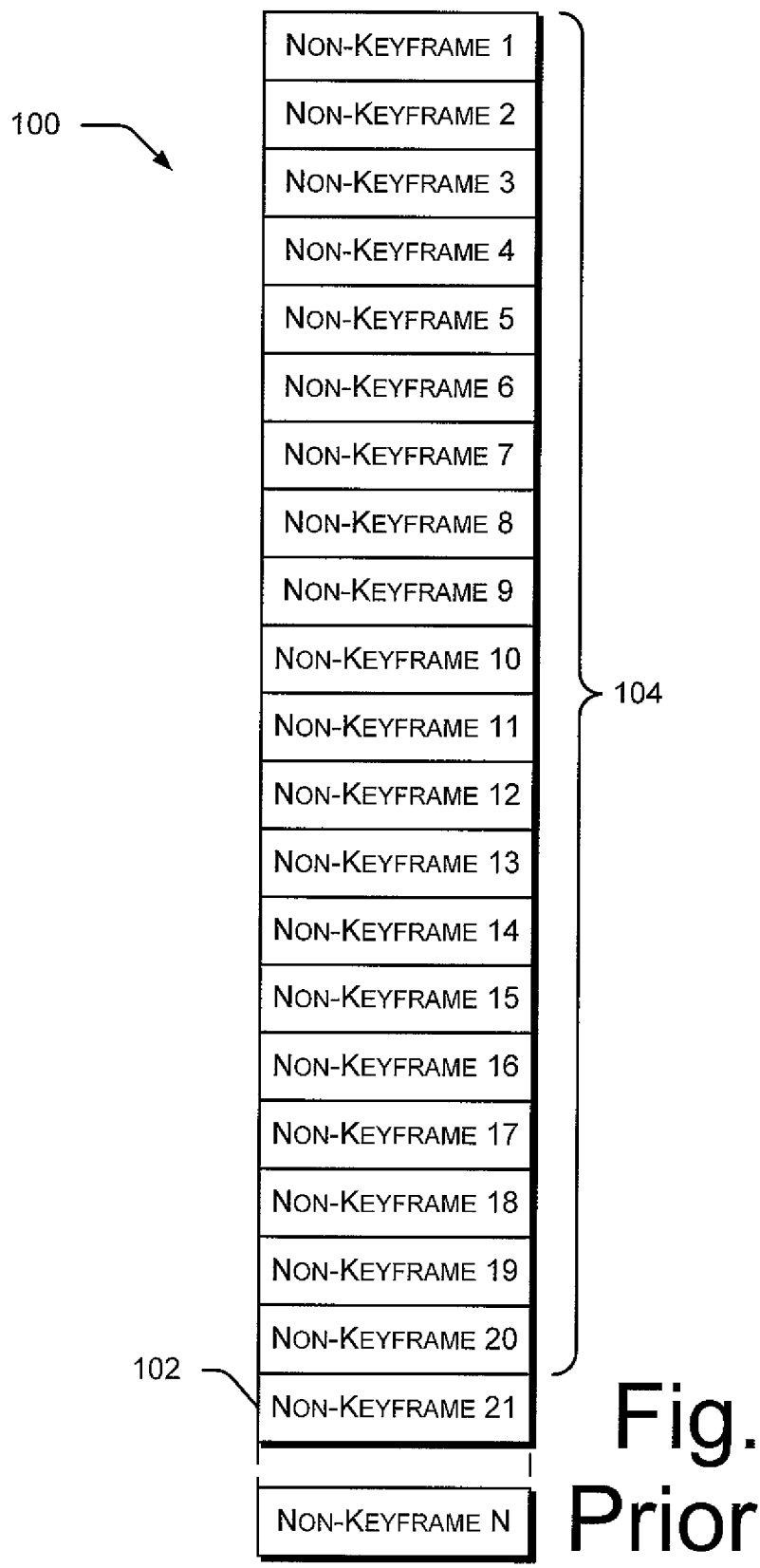
FIG. 1 illustrates a compressed digital video stream that includes a sequence of non-keyframes.
Figure 2:
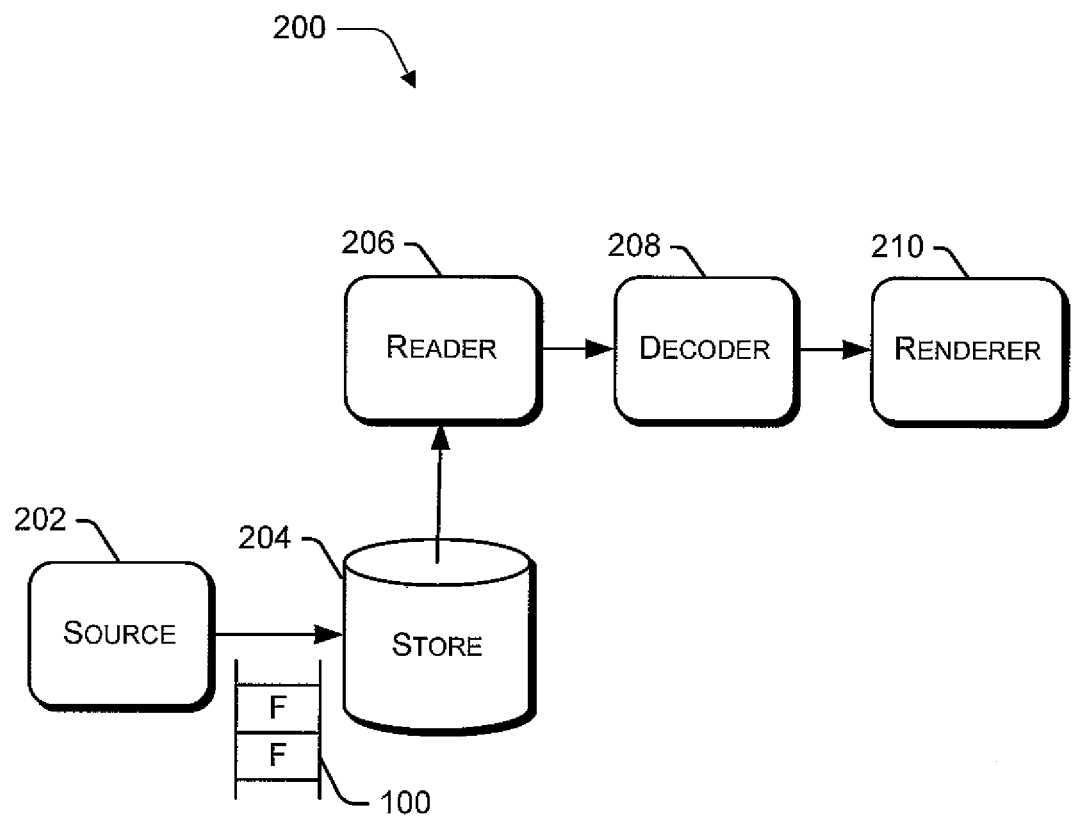
FIG. 2 is a block diagram of a conventional digital video recorder that can be used to decode the video stream of FIG. 1.
Figure 3:
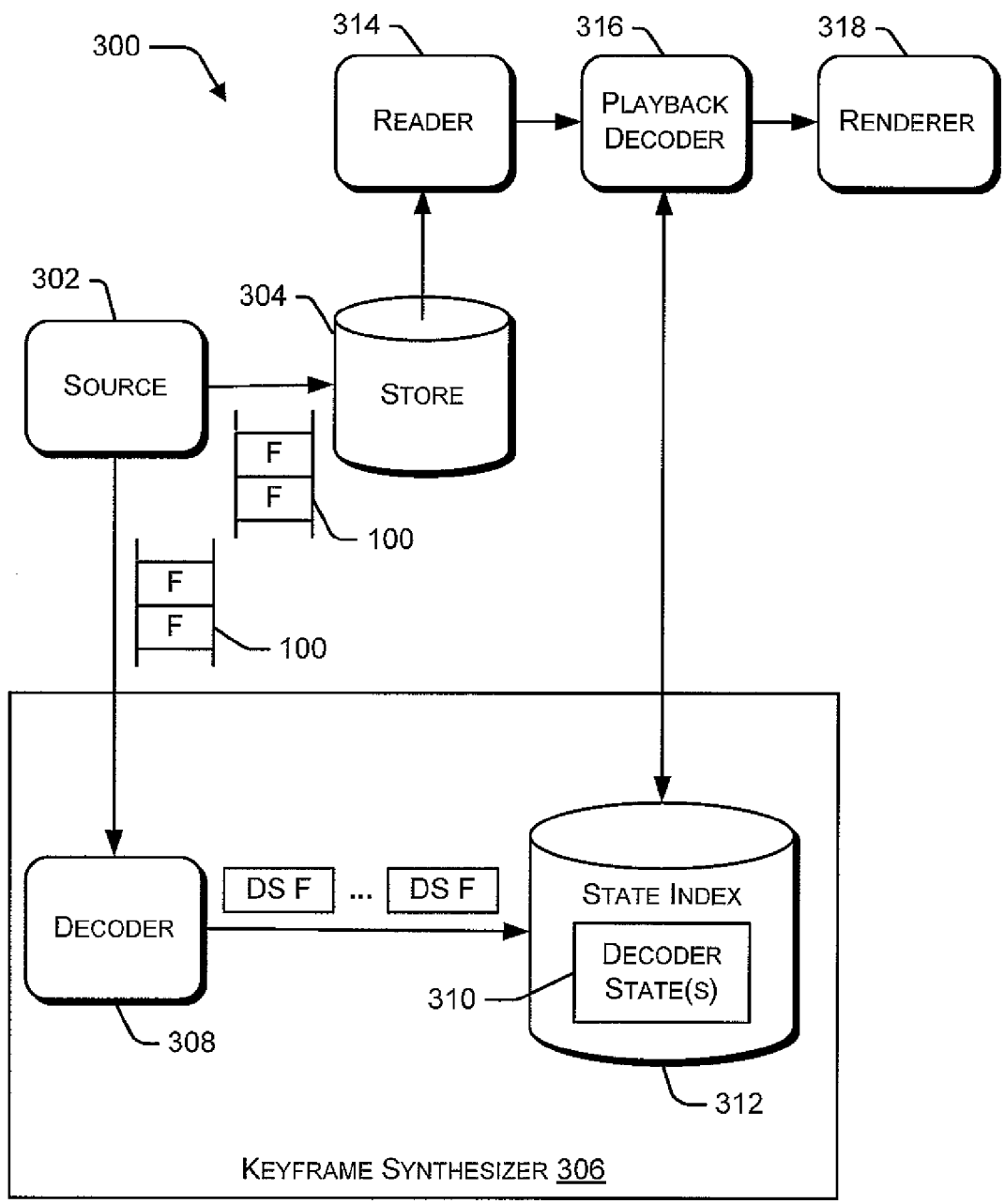
FIG. 3 is a block diagram of digital video recorder with a keyframe synthesizer according to a first implementation in which keyframe synthesis is performed as a digital video stream is recorded.

FIG. 3 illustrates a digital video recorder 300 according to a first implementation in which keyframes are synthesized as an incoming digital video stream is being recorded. The recorder 300 has a source 302 that provides a is compressed video stream 100 having a sequence of frames. The video stream 100 composed exclusively or primarily of non-keyframes. The stream has either no keyframes, or relatively few keyframes. More generally, the video stream 100 has fewer keyframes than are typically used to play the video stream at an accelerated speed and frame rate in the forward or reverse direction.

The video stream 100 received from the source 302 is recorded in a store 304. The store 304 may be configured, for example, as disk memory with sufficient capacity to hold one or more digital video streams. While the video stream is being recorded in the store 304, it is also passed to a keyframe synthesizer 306 which is capable of synthesizing keyframes that may be used for prompt playback of the digital video stream 100 from any non-keyframe in the video stream. The keyframe synthesizer may be configured to synthesize keyframes for each and every non-keyframe, or for less than all non-keyframes. During playback, decoding can begin from any particular non-keyframe for which there is a synthesized keyframe. Additionally, prompt playback can be achieved from other non-keyframes that are close to and subsequent to the particular non-keyframe by decoding a small number of intervening non-keyframes.

A synthesized keyframe may be as simple as a representation of the properly decoded form of the associated frame, or it may be as complex as a representation of the entire state of the decoder including all currently active reference frames. The term "synthesized keyframe" is not intended to imply that the synthesized keyframe contains only data for the decompressed frame. The synthesized keyframe may be represented in a number of different ways that are all equivalent in terms of allowing the decoder to resume decoding at or near the location of the associated frame. All such representations are within the scope of this invention.

The keyframe synthesizer 306 has a decoder 308 to decode the frames from the video stream 100. Occasionally, during decoding, a decoder state 310 of the decoder 308 is captured and stored in a state index 312. The state index 312 may employ its own separate memory to store the decoder states, or use a portion of the store 304.

In general, the decoder state 310 represents the state of the decoder 308 at an arbitrary point in time when decoding consecutive frames of the video stream 100. The state of the decoder is built up over time from decoding the frames in sequence. The state may be captured just before, or just after, decoding the associated frame. Each decoder state 310 essentially describes the state of the decoder 308 after decoding all preceding frames and at a point just prior to, or just after, decoding the corresponding frame so that the decoder state, when re-loaded at the time of playback, enables full and complete rendering of the corresponding frame, but before decoding of the next frame. For instance, the states may contain reference data accumulated in reference buffers of the decoder after decoding a series of frames. Alternatively, the decoder states may include representations of fully decompressed frames. In another implementation, individual decoder states may include arbitrary data from the associated frame. Arbitrary data can be essentially any piece of data from a frame, and is implementation dependent. For example, the frame type is a piece of arbitrary data from a frame.

Whether the decoder state is captured just before or just after decode of the associated frame is a matter of design choice. If the decoder state is captured before decode of the associated frame, then decode of that frame during playback occurs after loading the decoder state. Conversely, if the decoder state is captured after decoding the associated frame, then the frame is merely output during playback without further decoding. Once a timing is decided upon, the keyframe synthesizer consistently stores that type of state (i.e., pre-frame or post-frame) in the state index. Theoretically, although perhaps not as practical, the decoder state can alternatively be captured at some point midway through decoding the associated frame.

Decoder states may be captured in different ways. For example, the decoder 308 may be configured to output the decoder states for each frame, or for every $N^{th}$ frame (where N>1). Alternatively, the state index 312 may be configured to request states from the decoder 308. As another alternative, the decoder 308 may be equipped with a state reading component that reads and outputs decoder states on a periodic or an as-requested basis.

Decoder states 310 can be associated with corresponding frames. The association may be accomplished through the data structure of the state index. The frames corresponding to the decoder states may be identified using different parameters including, for example, unique frame numbers, an offset value of the frame within the digital video stream, or a timestamp of the frame.

As noted above, individual decoder states may include representations of fully decompressed frames. In this situation, the state index may utilize lossless or lossy image compression and/or image scaling when storing the decoder states. If lossy image compression is used, some image data contained in the decoder's reference buffers is lost. As a result, the state index effectively stores image data that, when reconstructed, results in a lower quality image than the original image from which it is derived. However, such data is still considered valid representations of the original reference buffers from which they came.

In terms of keyframe synthesis, the decoder state 310 provides substantially the same information as a keyframe for purposes of decoding. The decoder state 310 is complete to the extent that when loaded into a decoder, will allow immediate decoding to resume at or near an associated frame in the video stream 100 without having to decode a large number of preceding frames that would otherwise need to be decoded to build up the decoder state. By allowing decoding to resume near the associated frame, rather than precisely at the associated frame, the state index 312 can flexibly contain fewer decompressed frames when the recorder 300 is used with some compressed video formats.

For playback of the recorded video streams, the digital video recorder 300 includes a reader 314 to retrieve frames of the video stream 100 from the store 304. The frames are passed to a playback decoder 316, which decodes the frames and passes the decoded frames to a renderer 318 for rendering of displayable images. The reader 314 may be configured to coordinate and control the operation of the playback components. Although only one reader and one playback decoder are shown, the digital video recorder can be equipped with multiple readers and playback decoders that operate concurrently.

The playback decoder 316 is coupled to the keyframe synthesizer 306 to receive synthesized keyframes that may be used when decoding randomly accessed frames in the store 304. For instance, suppose the recorder 300 receives a user request to start decoding at a particular target frame somewhere in a video stream. The reader 314 accesses the target frame from the store 304 and passes it to the playback decoder 316. The playback decoder 316 also asks the state index 312 for a decoder state 310 that is associated with the target frame or with a preceding frame proximal to the target frame. The state index 312 locates and retrieves an appropriate decoder state 310. This retrieval may be based on various characteristics of the compressed frames in the stream, including but not limited to, the order (or ordinal) of the frames in the video stream, offset values of the frames within the video stream, and timestamps associated with the frames.

The retrieved decoder state 310 is loaded into the decoder 316 so that the decoder may be placed in the same state that it would otherwise have been in had it decoded the sequence of frames preceding the target frame. If the decoder state corresponds directly with the target frame, the playback decoder 316 uses the loaded state to begin decoding the target frame immediately. The decoder 316 is thus able to output a completely specified decompressed digital video frame for rendering without any delay.

On the other hand, if the decoder state is associated with a preceding frame proximal to the target frame, the playback decoder 316 begins decoding at the proximal frame and continues with any intervening frame(s) until it reaches and decodes the target frame. In one implementation, where the target frame does not have an associated decoder state, the recorder 300 employs a position pointer to identify the nearest preceding frame in the video stream 100 that has an associated decoder state. The decoder begins decoding at the identified proximal frame and advances sequentially through the frames until the target frame is decoded. At this point, the decoder 316 has built up the proper state to enable output of a completely specified decompressed target frame.

It is noted that the number of frames between the target frame and the nearest proximal frame associated with the decoder state is less than the number of frames that would need to be decoded if the decoder had to begin building up the entire state from scratch. Accordingly, even when the recorder begins decoding near the target frame instead of at the target frame, the recorder 300 is still able to output displayable images without significant delay. Additionally, in this situation, the decoder state of the playback decoder 316 at the time of decoding the target frame may be captured and recorded in the state index 312 for future use.

Accordingly, the digital video recorder 300 with keyframe synthesizer 306 enables random access to and rendering of any non-keyframe in the stream 100. The resulting decompressed frames are available for use in normal playback, fast forward, fast rewind, and/or seek operations. In fast forward and rewind modes, the state index 312 can be used to achieve fast frame rates that are not possible with conventional techniques, which require decoding of all or many preceding frames for each displayed frame. By loading pre-captured decoder states, the playback recorder is capable of quickly generating a series of frames for display in fast forward or fast reverse. To make fast forward or fast reverse frame rates as high as possible, the recorder may intelligently choose to generate only frames having corresponding decoder states in the state index 312.

It is noted that not all compressed frames necessarily have a corresponding decoder state stored in the state index. Recording a decoder state for each frame involves more processing and memory resources, but enables very efficient playback at both normal and accelerated rates. In implementations where such resources are not available, the keyframe synthesizer 306 may capture fewer decoder states than the number of frames. A small and coarse state index is easily manageable, but limits the number of positions in the stream to which the state index allows quick access. This can cause lack of accuracy when the user skips around, and low frame rate at slower speeds of fast forward and rewind. One suitable tradeoff is to capture and store one decoder state in the state index for every second of video stream.

The decoding capabilities of the digital video recorder vary depending upon implementation criteria. The recorder may be configured to support only one decode operation at a time, permitting either decoding of the stream as it arrives using decoder 308 or decoding the stream during playback using playback decoder 316. In such an implementation, a single decoder may be used to perform the tasks of decoder 308 and playback decoder 316. Alternatively, the recorder 300 may be configured with adequate resources to accommodate real-time decoding at decoder 308 of one or more streams being recorded in store 304 from source 302, while simultaneously supporting real-time decoding of streams stored in store 304 by playback decoder 316. Another implementation of the digital video recorder is described below with reference to FIG. 10.

Capturing Decoder States in Non-Keyframe Video Stream

Figure 4:
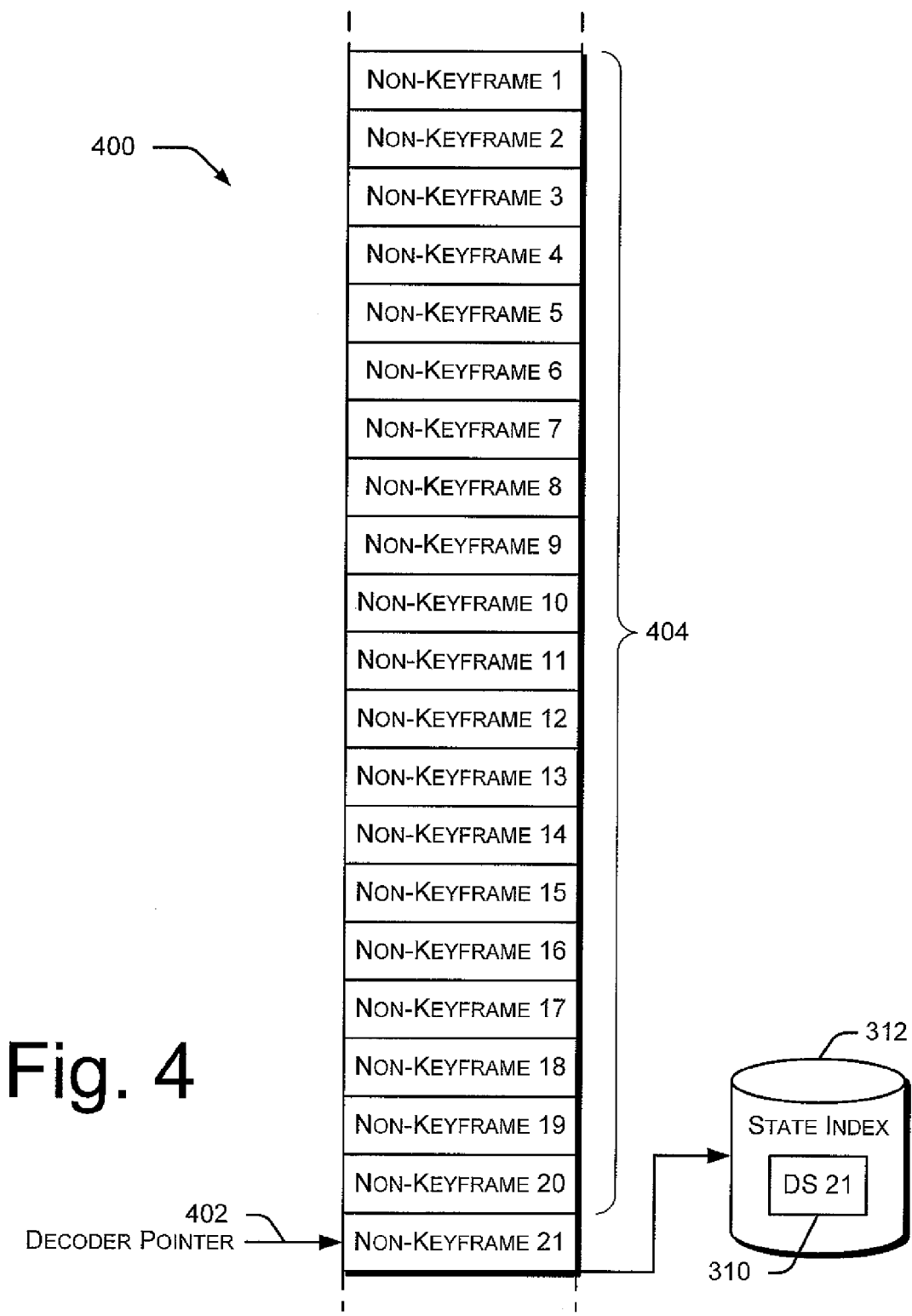
FIG. 4 shows a portion of an exemplary digital video stream to illustrate how decoder states are captured and stored for use in the keyframe synthesizer of FIG. 3.

FIG. 4 shows a portion of an exemplary video stream 400 to illustrate how decoder states can be captured and stored in the state index. The video stream 400 has either exclusively non-keyframes, or predominantly non-keyframes with a few keyframes. The non-keyframes represent an arbitrary sequence of frames in the stream 400, but they are labeled sequentially from 1 to 21 for referencing purposes. As the recorder 300 receives the video stream 400, the frames are passed to the decoder 308 of the keyframe synthesizer 306. The decoder 308 decodes the frames as they arrive.

Suppose, for example, the decoder 308 is currently decoding non-keyframe 21, as indicated by the pointer 402. Prior to this frame, the decoder 308 has decoded several previous non-keyframes, such as the preceding twenty non-keyframes 1-20, as represented by reference number 404. Having decoded the preceding non-keyframes 1-20 and the current non-keyframe 21, a valid image for the current frame 21 is produced within the decoder 308. The decoder's state just after decoding of non-keyframe 21 is captured and stored in the state index 312. This decoder state for non-keyframe 21 is represented as "DS 21". The state index 312 maintains an association between the decoder state 310 for frame 21 and the non-keyframe 21 from which the decoder state is captured. This association may be achieved in many ways including, for example, storing a reference pointer to the associated frame or storing a frame identifier (e.g., a frame ordinal number, an offset value of the frame in the stream, a timestamp of the frame, etc.) in relation to the decoder state. The decoder state for frame 21 enables the decoder, during playback, to resume decoding at the non-keyframe 21 without having to re-decode the preceding frames.

Figure 5:
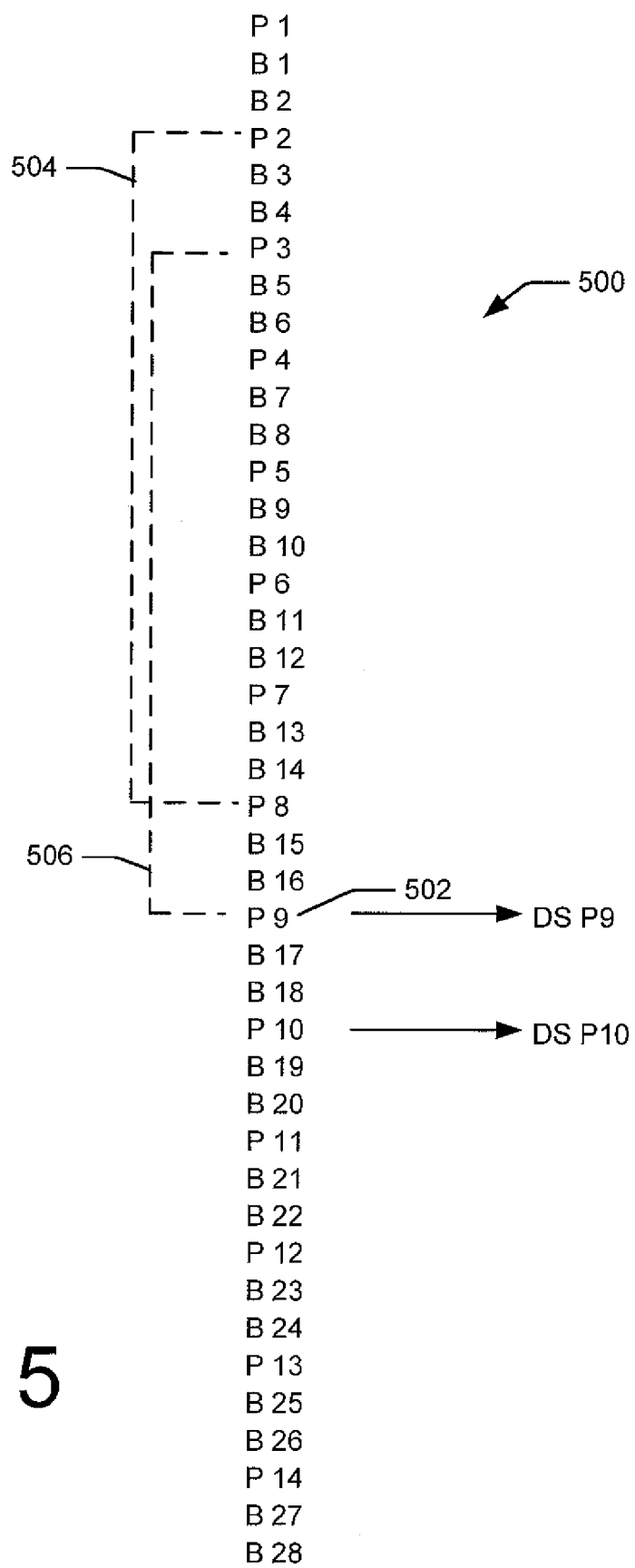
FIG. 5 shows one specific example of a digital video stream encoded using the MPEG 2 format to demonstrate capture of decoder states in an MPEG-compatible decoder.

FIG. 5 shows one specific example of a video stream 500 that is encoded in the MPEG 2 format. The stream 500 has multiple P-frames, represented by frames P1 through P14, and B-frames interleaved between sequential pairs of P-frames. When the stream is passed to decoder 308 of keyframe synthesizer 306, proper decoding of P-frame P9 (referenced as number 502) depends on decoding a previous sequence of frames in sequential order, such as sequence 504 encompassing P-frames P2-P8. P-frames do not depend on the interleaved B-frames, so the decoder 308 disregards the B-frames in sequence 504.

Assuming the decoding begins at P-frame P2, the decoder 308 does not generate a valid image for any of the individual frames P2-P8. However, a valid image for P-frame P9 is nonetheless produced within the decoder when the decoder finishes decoding P-frame P9 after having decoded the entire sequence 504. After decoding P-frame P9, but before decoding the next B-frame B17, the 8 state of decoder 308 is captured and stored in the state index 312. This decoder state for P-frame P9 is represented in FIG. 5 as "DS P9". When the stream is subsequently played back in normal or accelerated modes, this state allows decoding to resume at or near P-frame P9 without having to decode the entire sequence 504.

A decoder state for P-frame P10 (i.e., DS P10) can be captured and stored after decoding the preceding sequence 506 of P-frames P3-P9. If the preceding frames P2-P9 have already been decoded to produce a complete image for P-frame P9, the decoder 308 need only decode the next P-frame P10 in order to produce a complete image and generate a suitable decoder state DS P10.

It is noted that although sequences of seven preceding frames are shown in FIG. 5, the number of frames needed to produce a complete image varies depending upon the encoder implementation, encoder configuration, and coding format. Additionally, while B-frames need not be decoded to generate and store decoder states for the P-frames, the B-frames can be decoded if they are desired for some other purpose, such as display.

Each compressed P-frame in the stream has a portion that does not rely on any other data in order to decode correctly, and a portion that relies on previously correctly decoded data to decode correctly. Portions of the P-frame that do not rely on previously decoded data decode correctly assuming the video stream is not corrupted. Portions of the P-frame that do rely on previously decoded data decode correctly if that previously decoded data itself is decoded correctly. More specifically, if decoding starts at a particular P-frame, the particular P-frame and subsequent P-frames help to fill in the video rendered onto a visual display screen. Often, the non-dependent portions of a series of P-frames form a regular repeating pattern that fully paints the video with valid data that does not depend on previous data.

Figure 6:
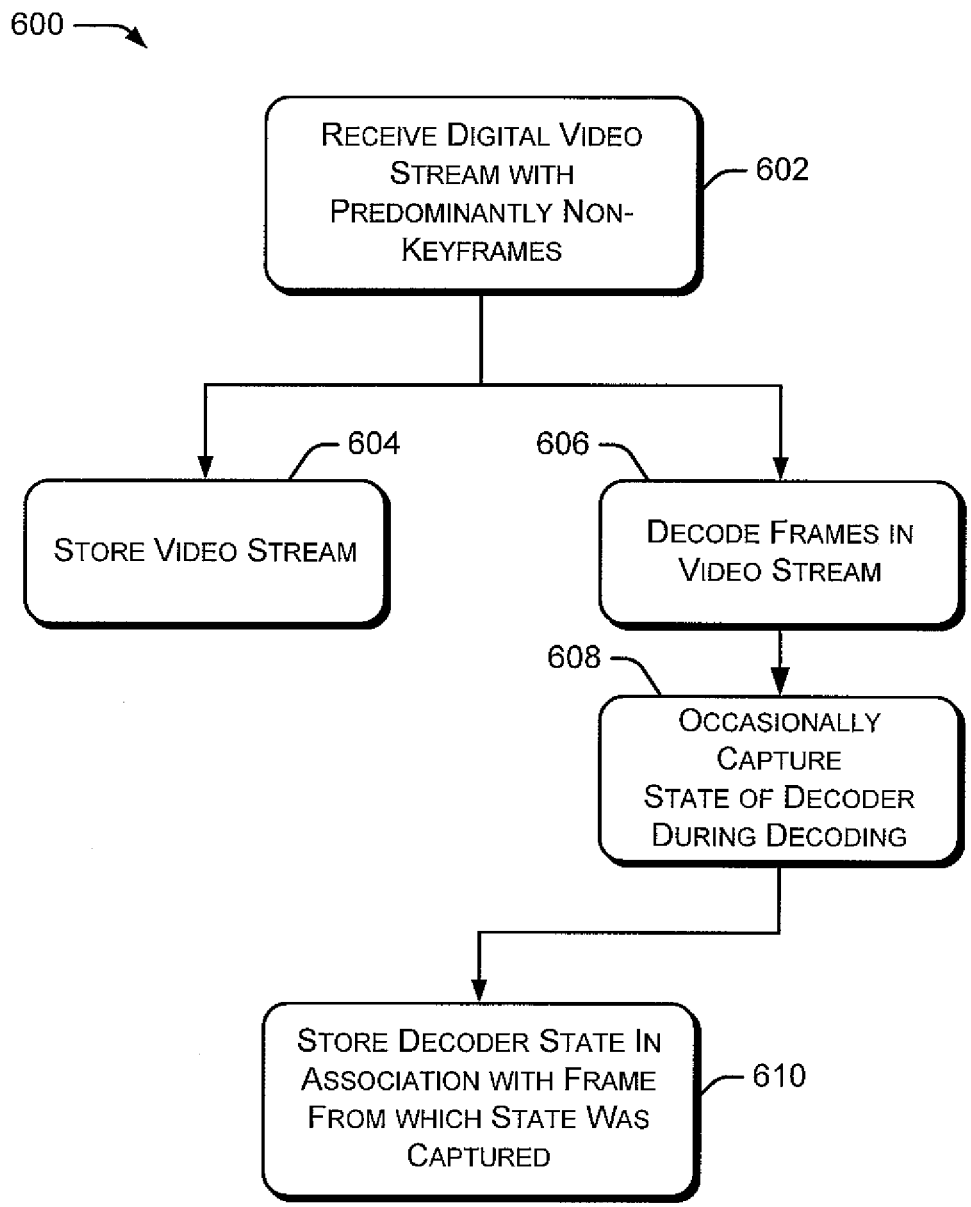
FIG. 6 shows an exemplary process for capturing and storing decoder states is when decoding a video stream having no, or few, keyframes.

FIG. 6 shows an exemplary process 600 for capturing and storing decoder states when decoding a video stream having no, or few, keyframes. The process will be described with reference to the implementation of the digital video recorder 300 described in FIG. 3. The process 600 is implemented in any suitable hardware, software, firmware, or combination thereof. In the case of software and firmware, process 600 represents a set of operations that may be implemented as computer-executable instructions stored in memory that can be executed by one or more processors.

At block 602, a compressed digital video stream having predominantly non-keyframes is received from source 302. Generally, the number of keyframes in the compressed video stream, if any, is insufficient to perform operations at accelerated speeds, such as fast forward and/or fast reverse. At block 604, the video stream is stored in store 304.

At block 606, the non-keyframes of the compressed video stream are passed to the keyframe synthesizer 306 and decoded at decoder 308. The decoding can be performed previous to, concurrently with, or after storage of the associated frames of the stream in store 304. The decoder 308 exhibits different decoder states as frames are decoded, and the decoder state changes as each frame is decoded.

At block 608, the keyframe synthesizer occasionally captures the decoder state 310 of the decoder 308. The decoder state may represent the exact state of the decoder after decoding a corresponding frame, or it may represent a decoder state that will allow decoding to resume at or near the corresponding frame when the state is reloaded into the decoder. The decoder state may be taken after decoding each frame, or on a less frequent basis. The decoder state may be captured periodically, or on a more arbitrary basis. As one example, the decoder state is captured for every second of video at normal play speed. This means that the decoder state is saved approximately once every 30 frames in the compressed video stream.

At block 610, the decoder state is stored in the state index 312 in association with its corresponding frame. This association may be accomplished via a table structure, pointers, or some other indexing technique.

Prompt Playback at Accessed Frame Using Decoder States

Figure 7:
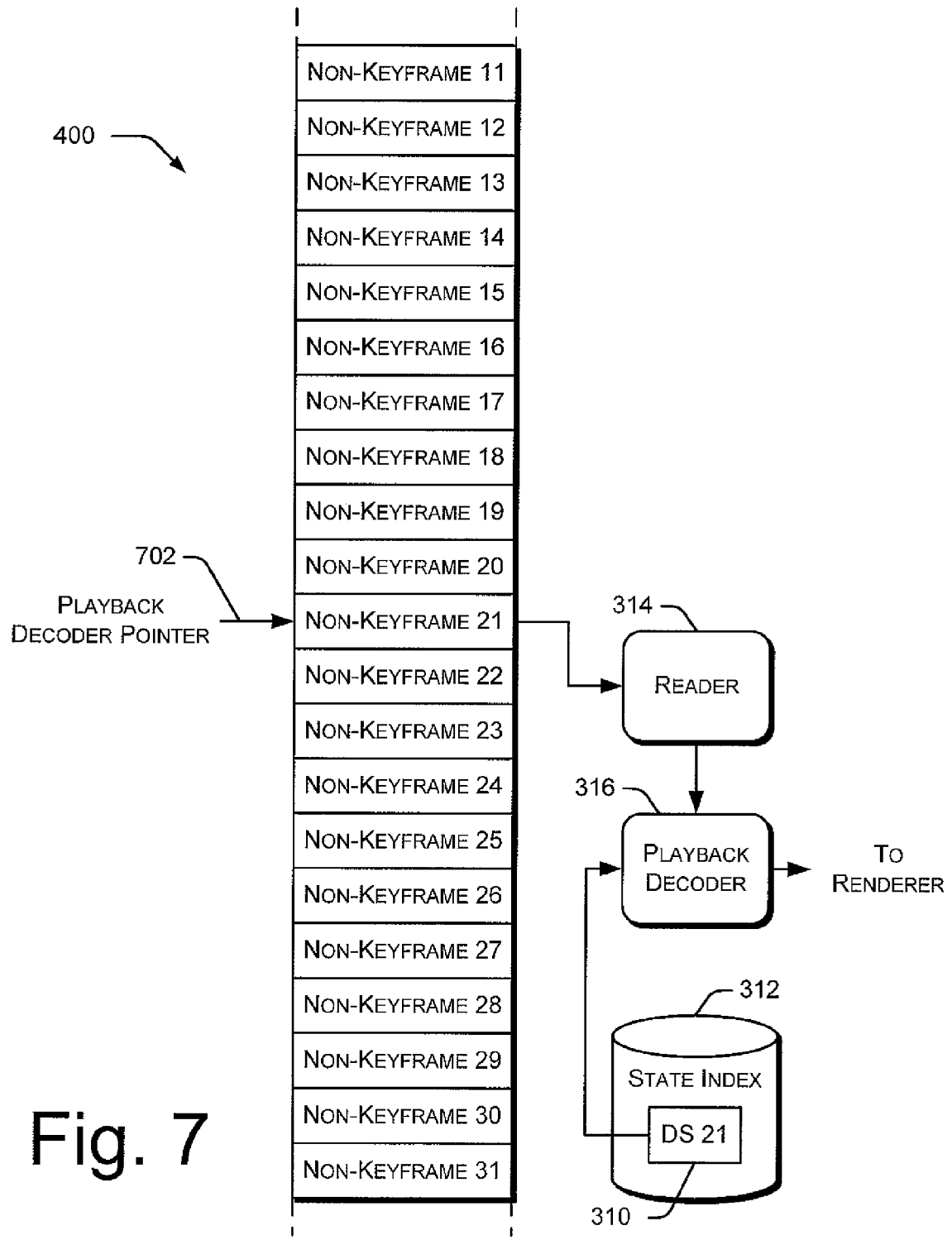
FIG. 7 shows the same video stream of FIG. 4, but slightly downstream, to illustrate how the decoder states are used to facilitate immediate playback at normal or accelerated speeds starting at a randomly accessed frame.

FIG. 7 shows the same video stream 400 of FIG. 4, but slightly downstream, to illustrate how decoder states in the state index are used to facilitate immediate playback at normal or accelerated speeds when starting at a randomly accessed frame in the store. This portion of the video stream 400 has been previously stored in store 304 and associated decoder states for this portion of the stream have been captured and stored in state index 312. The video stream 400 may be stored in whole or in part in the store 304.

As an example of storing part of a video stream, digital video recorders are capable of simultaneously playing back one portion of a video stream while recording another portion of the video stream. For instance, a user may be "delayed" in a live program. The recorder continues to record the live program while concurrently playing back the recorded portions from the playback point. The user may fast forward to catch up to the live program.

Now, suppose the user requests to begin playback at non-keyframe 21, as referenced by the playback decoder pointer 702. The reader 312 of recorder 300 accesses the non-keyframe 21 in store 304 and passes it to the playback decoder 316. The decoder state DS 21 associated with non-keyframe 21 is also extracted from the state index 312 and loaded into the playback decoder 316. Recall that the decoder state DS 21 represents the state of decoder 308 taken after it decoded the preceding non-keyframes 1-20 and non-keyframe 21. The captured decoder state thus represented a complete valid image for the non-keyframe 211. Accordingly, with this state, the playback decoder 316 is able to immediately output non-keyframe 21 to the renderer 318 for rendering and display to the user. The recorder may then continue with decoding non-keyframe 22 and following frames, if desired.

In this example, the decoder state is captured after decoding the associated keyframe. Alternatively, the decoder state DS21 can be captured just before the decoder 308 decodes non-keyframe 21. In this case, the decoder state DS21 represents the state of decoder 308 taken after it decoded the non-keyframes 1-20 preceding non-keyframe 21. With this state, the playback decoder is able to immediately decode non-keyframe 21 into a complete image that can be passed to the renderer 318.

In this manner, the keyframe synthesizer 306 essentially synthesizes a keyframe to enable prompt playback of any randomly accessed frame. In our example, the video stream does not have a keyframe preceding non-keyframe 21. But, by loading the state index previously captured when decoding the non-keyframe 21 during recording, the recorder is able to synthesize a keyframe just prior to the non-keyframe 21 so that playback can begin immediately without the delay of decoding many preceding frames.

It is noted that non-keyframe 21 may not have an associated decoder state in state index 312. In this case, the reader extracts the closest prior frame that has an associated decoder state in the state index. For example, suppose non-keyframe 17 is the closest prior frame. The decoder state associated with non-keyframe 17 is loaded in playback decoder 316 and the decoder begins decoding the video stream beginning at non-keyframe 17. The decoder then continues decoding all frames between non-keyframe 17 and non-keyframe 21. Upon reaching non-keyframe 21, the decoder is able to output a completely specified image. The decoder may then continue to decode subsequent frames, if desired.

As noted above, the keyframe synthesizer may employ lossy compression 1 when storing states in the state index. If the state index uses lossy compression, the image reconstructed upon decoding the non-keyframe 21 (assuming it has an associated decoder state, or if not, the next closest non-keyframe 17 with an associated decoder state) may not be of the highest quality desired. That is, with lossy compression, some information is lost, which may adversely degrade quality of the resulting image. There is thus a tradeoff between the resource conservation achieved using lossy compression of the decoder states and image quality of the image reconstructed from the stored decoder states.

If lossy compression is used, the recorder may be configured to fully reconstruct the frame in background and substitute it for the lower quality image. For instance, suppose the user "pauses" the recorder on the frame of lower image quality. The recorder decodes a series of preceding frames in background to produce a high-quality reconstruction and then replaces the paused low-quality image with the high-quality image.

Figure 8:
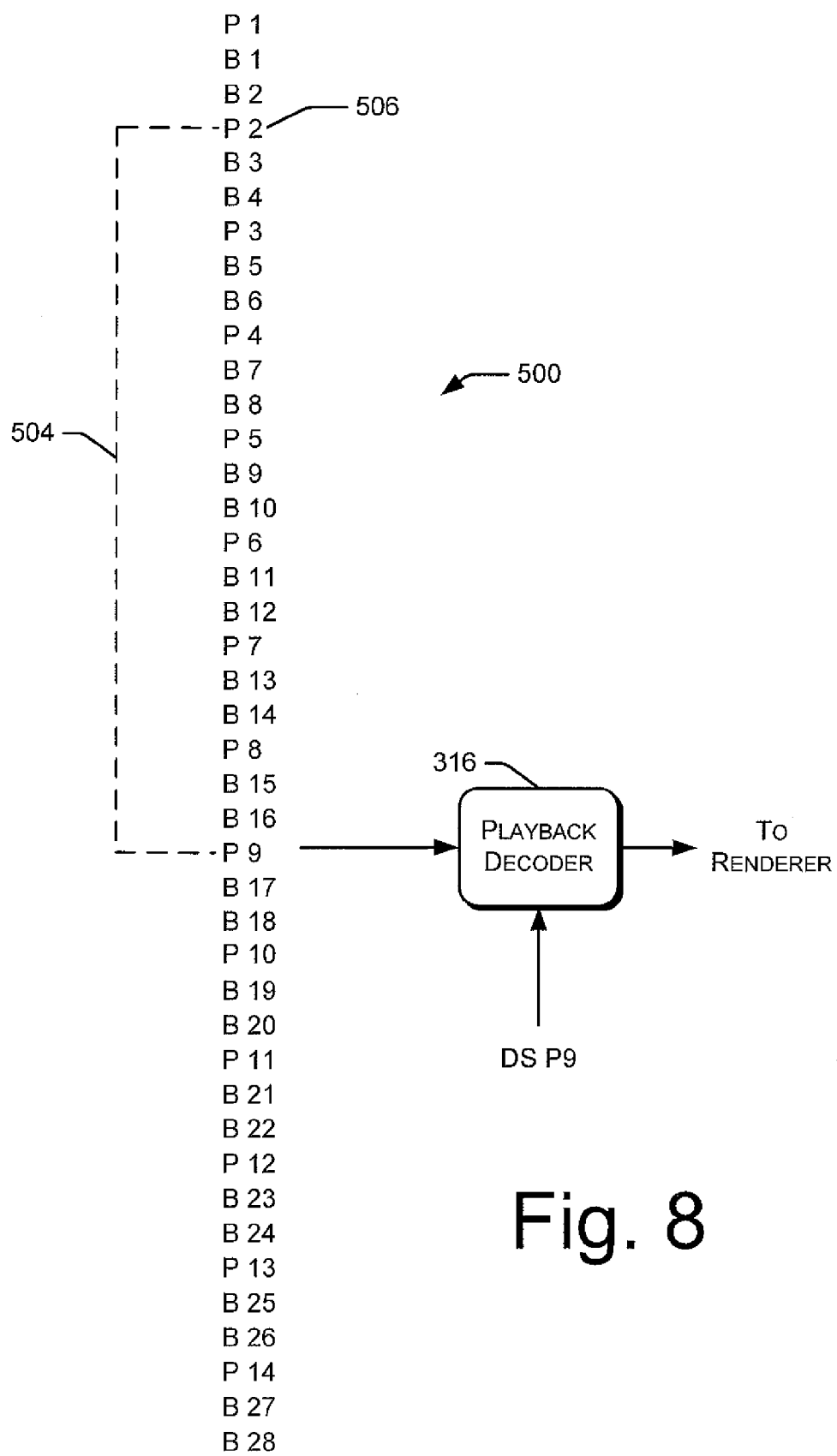
FIG. 8 shows the same MPEG 2 video stream of FIG. 5, but during playback.

FIG. 8 shows the same MPEG 2 video stream 500 as recorded in FIG. 5. To begin playback at P-frame P9 without having to first decode P-frames P2 through P8 (i.e., sequence 504), the decoder state corresponding to P-frame P9 is loaded from the state index 312 into the playback decoder 316, enabling the decoder to decode and output a complete image from decoded P-frame P9. Decoding can then continue forward with P-frame P10.

It is noted that in conventional MPEG 2 decoding where no states are stored and loaded, P-frame P9 is not output to the renderer until P-frame P10 is decoded. In contrast, the playback decoder 316 in recorder 300 is able to output P-frame P9 as soon as the associated state is loaded. This has no significant effect when resuming playback at P-frame P9, but the distinction is noted for purposes of discussing fast forward and rewind below.

Playback operations that require a high frame rate, such as fast forward and rewind, are achieved by repeated use of a process on each frame in the fast forward or rewind operation. To use P-frame P9 as one frame of a fast forward or rewind sequence, the decoder state corresponding to P-frame P9 is loaded from the state index and the decoder is set to that state. The playback decoder may or may not automatically output P-frame P9. If the playback decoder does not automatically output P-frame P9, the playback decoder can be induced to output P-frame P9 by using an appropriate technique for the specific decoder type. One appropriate technique is to present the P-frame P10 to the decoder. Another appropriate technique is to present a synthesized ("replacement" or "fake") P-frame to the decoder. Another technique is to call to an application program interface (API) of the decoder that instructs the decoder to output P-frame P9.

Figure 9:
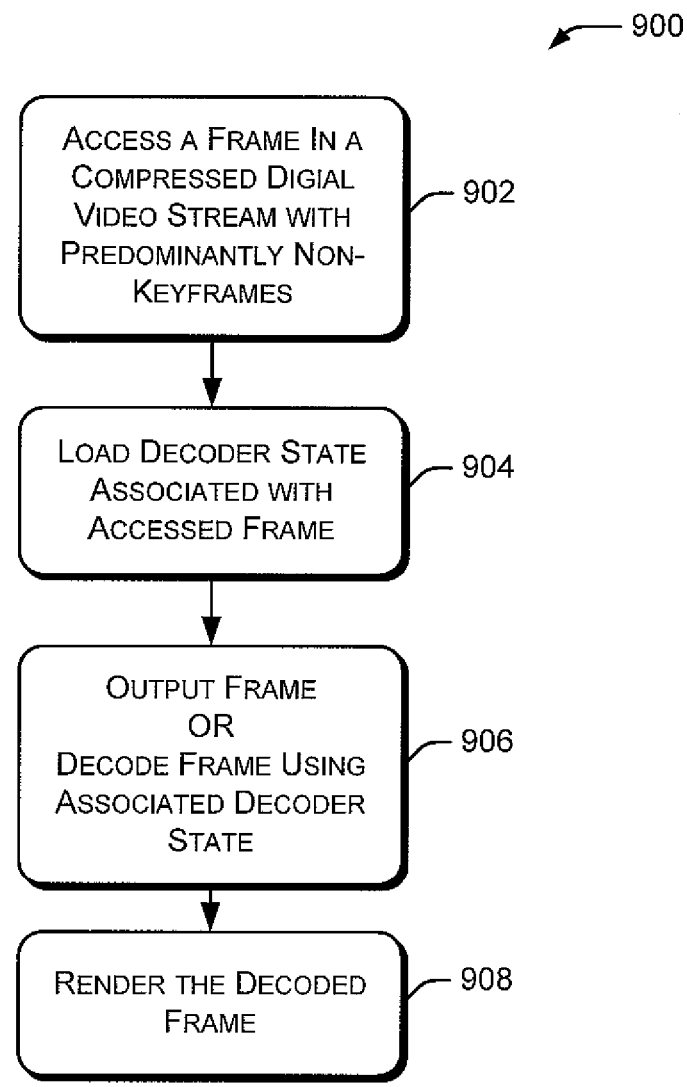
FIG. 9 shows an exemplary process for playing back a recorded digital video stream having no, or few, keyframes.

FIG. 9 shows an exemplary process 900 for playing back a recorded digital video stream having no, or few, keyframes. The process will be described with reference to the implementation of the recorder 300 described in FIG. 3. The process 900 is implemented in any suitable hardware, software, firmware, or combination thereof. In the case of software and firmware, process 900 represents a set of operations that may be implemented as computer-executable instructions stored in memory that can be executed by one or more processors.

At block 902, the reader 314 accesses the compressed digital video stream in store 304 and reads a particular target frame from which playback is requested. Playback may be requested for normal or accelerated speeds. The accessed frame is passed to the playback decoder 316. At block 904, the decoder state associated with the accessed frame is loaded from the state index 312 into the playback decoder 316. This state sets the playback decoder to essentially the same state it would have built up by decoding preceding frames in the video stream.

At block 906, the playback recorder 316 either outputs the frame without further decoding (e.g., in the case where the state was captured just after decoding the associated frame) or decodes the accessed frame using the decoder state to produce a completely specified image that can be rendered (e.g., in the case where the state was captured just prior to decoding the associated frame). At block 908, the decoded frame is passed to renderer 318 for rendering and display to the user. As a result, the decoder state effectively functions as a synthesized keyframe in that it sets the playback decoder 316 to the appropriate state to enable production of a complete image from decoding of a non-keyframe, even where no prior frames have been decoded.

It is noted that the frame from which playback is requested may not have a corresponding decoder state in the state index. In this situation, the reader may access a preceding frame that has an associated decoder state and begin decoding at that point. The recorder then continues decoding frame-by-frame until reaching the requested frame. Once the requested frame is decoded, it can be output for rendering and display.

Digital Video Recorder with Background Keyframe Synthesis

Figure 10:
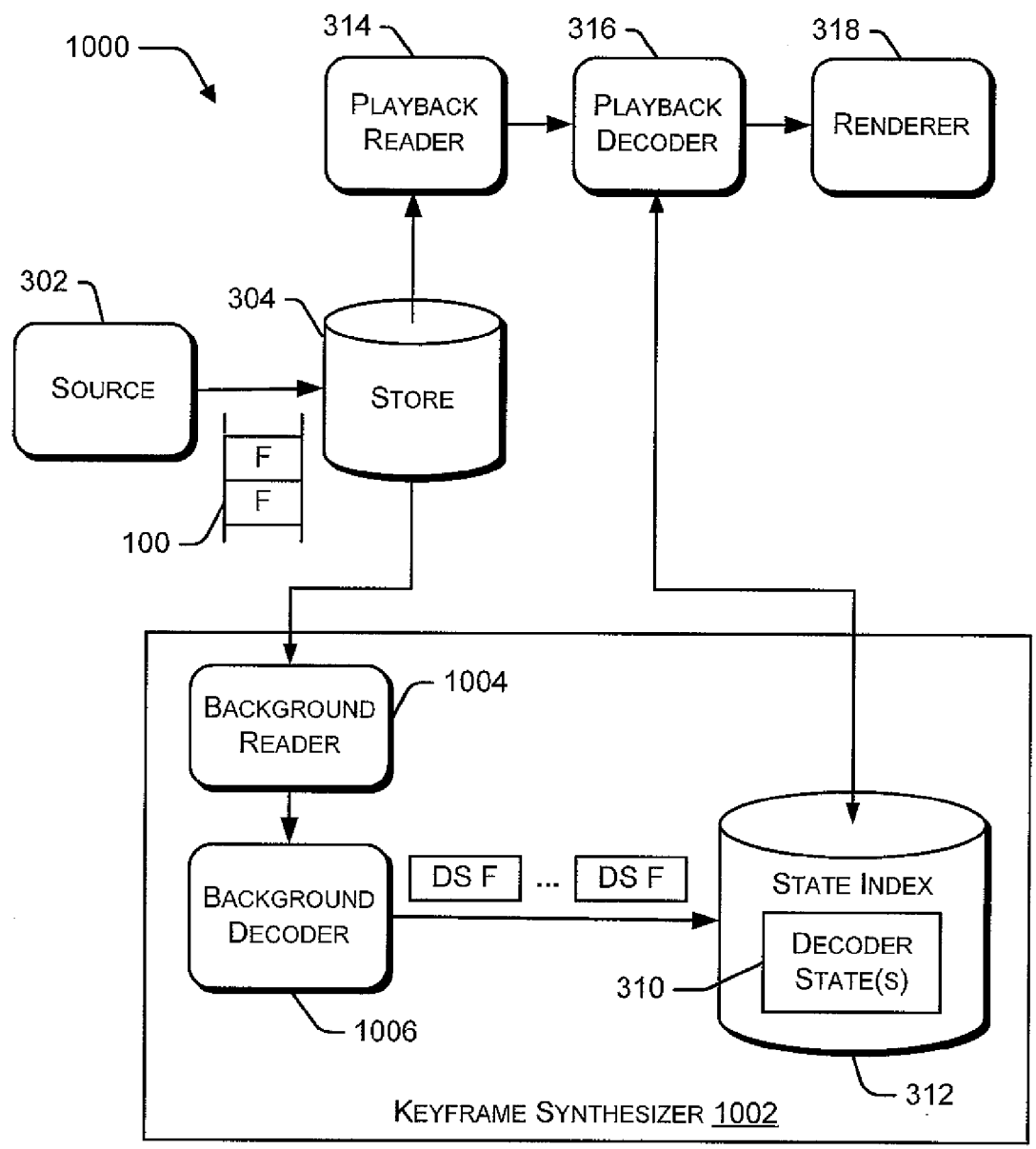
FIG. 10 is a block diagram of digital video recorder with a keyframe synthesizer according to a second implementation in which the keyframe synthesis is performed as a background process.

FIG. 10 illustrates another implementation of a digital video recorder 1000 in which the keyframe synthesis is performed in background. In this implementation, a compressed digital video stream 100 from source 302 is recorded in the store 304 without concurrently being passed to the keyframe synthesizer. As before, the video stream 100 is composed exclusively or predominantly of non-keyframes, so that the stream has either no keyframes or relatively few keyframes.

The recorder 1000 has a keyframe synthesizer 1002 connected to the store 304. The keyframe synthesizer 1002 is capable of synthesizing keyframes that may be used for normal or accelerated playback of the digital video stream 100 starting at any non-keyframe in the stream. In the FIG. 10 implementation of the recorder 1000, the keyframe synthesizer 1002 derives decoder states for various streams in store 304 using a background process.

More specifically, the keyframe synthesizer 1002 has a background reader 1004 that reads individual frames from the store 304. The background reader 1002 can randomly access selected frames from any video stream in the store 304. The background reader 1004 passes each retrieved frame to a background decoder 1006, which decodes the frame. Occasionally, during the decoding, a decoder state 310 of the background decoder 1006 at the point of decoding a frame is captured and stored in a state index 312. The decoder state 310 is stored in association with the frame from which it is derived and represents the state of the background decoder at the time of processing that frame. The decoder state 310 need not be the exact decoder state prior to or after decoding the corresponding frame; but, can be a state that will allow decoding to resume at or near the corresponding frame when the state is reloaded into the playback decoder. The state index 312 may employ its own separate memory to store the decoder states, or use the store 304.

Since this process occurs in background, the keyframe synthesizer 1002 maintains a notion of which frames ought to be in the state index 312 for every digital video stream in store 304. For example, such a notion could be even divisibility of the number of frames in the stream by some value N (e.g., N=30). In this case, a decoder state 310 is captured for every $N^{th}$ frame of video stream 100. If at any point the background decoder 1006 correctly decodes an $N^{th}$ frame that should be in the state index but is not, a decoder state associated with that frame is added to the state index. It is noted that any new decoder states derived by the playback decoder 316 during playback may also be added to the state index 312.

The digital video recorder 1000 also includes a playback reader 314 to retrieve frames of the video stream 100 from the store 304 during playback at normal or accelerated speeds. The frames are passed to a playback decoder 316, which during normal playback decodes the frames and passes the decoded frames to a renderer 318 for rendering.

The playback decoder 316 is coupled to the keyframe synthesizer 1002 to receive synthesized keyframes that may be used when decoding frames in the video stream 100. When the recorder 1000 is requested to start decoding at a particular target frame, the playback decoder 316 requests the state index 312 to provide the decoder state 310 associated with the target frame or with a frame proximal to the target frame.

The state index 312 locates and retrieves the decoder state 310, which is then loaded into the playback decoder 316 so that the decoder may be placed in the same state that it would otherwise have been in had it decoded the sequence of frames preceding the target frame. The reader 314 accesses the target frame from the store 304 and passes it to the playback decoder 316. If the state corresponds directly with the target frame, the playback decoder 316 uses the loaded state to begin decoding the target frame immediately. If the state is associated with a frame proximal to the target frame, the playback decoder 316 begins decoding at the proximal frame and continues decoding frames in sequence until it reaches the target frame. In this situation, a decoder state associated with the target frame can be captured and stored for future use. In either case, the decoder 316 outputs a completely specified decompressed digital video frame for rendering without any delay. The decompressed digital video frames are available to be used in normal playback, fast forward, rewind, and seek operations of the video stream 100.

Since the keyframe synthesizer 1002 operates in the background, it can work on one or more video streams at a time. These streams can be currently recording streams or streams that have been previously recorded.

In another implementation, the functions of the playback decoder 316 and the background decoder 1006 are performed by the same decoder. The single decoder and store have a finite amount of resources that can be allocated for either playback operations or background operations. Playback operations usually take precedence, so the amount of resources available for building state indexes in background can range from zero (if playback is using all resources) to full (if no playback is occurring). If no unused resources are available, the single decoder does not perform any state index work of the background decoder 1006, although some state index work associated with a currently playing stream may be given sufficient priority to be accomplished. However, when extra unused resources are available, the resources are used to complete the state index for video streams that have incomplete state indexes.

The selection of which streams are worked on is a matter of implementation detail. In one implementation, video streams that are currently playing and nearest to reaching a point where their decoder state index is incomplete and a next state is needed are assigned highest priority. Additionally, decoding of a video data stream can be interrupted and resumed as priorities for the decoder resources change. Priorities for processing video streams might change, for example, when a higher priority video stream becomes available or when the decoding resources are used for playback operations.

When a stream is selected for background processing, the reader reads the stream and the single decoder begins performing the tasks of the background decoder 1006. The decoder begins decoding at a position in the stream that sufficiently precedes the first needed position in order to obtain a valid decoder state for that position in the stream. Decoding proceeds onward from this point and decoder states are captured occasionally as desired. The keyframe synthesizer may skip over sections of the stored video stream that are deemed unnecessary for construction of the state index 312 when the desired decoder states are sufficiently far apart.

If fast forward, rewind, seeking, or any other operation is performed by the user and no decoder states are available for the requested section of the stream, the to recorder 1000 generates appropriate decoder states on the fly and stores them in the state index. This can be performed, for example, by the playback decoder configured to use conventional techniques to decode an entire sequence of preceding frames to produce a completely decoded frame. The reader then prompts the playback decoder to create decoder states for the requested section of the video stream. The decoder states are stored in the state index as they are generated. This mode of operation is similar to how a system without a state index would operate, the difference being that decoder states are stored and retained in the state index for the next time the user requests such operations. In this way, after the first fast forward or rewind over a section is achieved using conventional decoding techniques without use of decoder states, subsequent fast forwards or rewinds over the same section of video can be achieved more quickly and efficiently using the newly captured decoder states.

Figure 11:
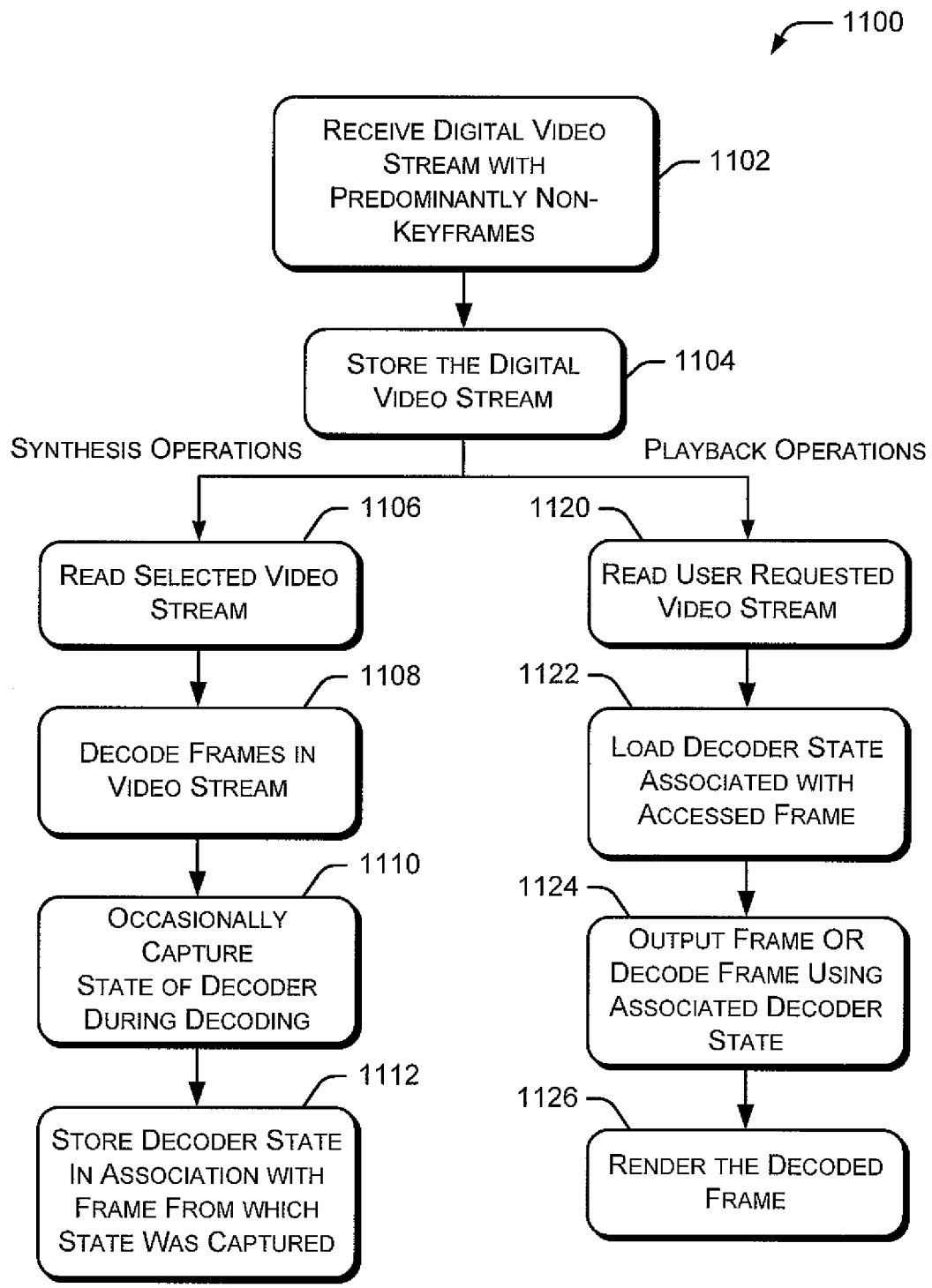
FIG. 11 shows an exemplary process for capturing and storing decoder states of one or more digital video streams in background while, in parallel, playing back the same or different recorded digital video stream.

FIG. 11 shows an exemplary process 1100 for capturing and storing decoder states of one or more digital video streams in background while, in parallel, playing back the same or different recorded digital video stream. The streams have few or no keyframes. The process 1100 will be described with reference to the implementation of the recorder 1000 described in FIG. 10. The process is implemented in any suitable hardware, software, firmware, or combination thereof. In the case of software and firmware, process 1000 represents a set of operations that may be implemented as computer-executable instructions that can be executed by one or more processors.

At block 1102, a compressed digital video stream having predominantly non-keyframes is received from source 302. At block 1104, the video stream is stored in store 304. At this point, the process branches to two paths of operations—playback operations (e.g., normal speed playback, fast forward, rewind, seek, etc.) and synthesis operations (e.g., capturing and storing decoder states)—that may be performed in parallel. If the digital video recorder 1000 is equipped with two readers and two decoders, these operations may be performed simultaneously. Conversely, if the recorder 1000 is equipped with one reader and one decoder, these resources are used to perform the playback operations as requested, and to perform the synthesis operations in background when resources are available.

With respect to the synthesis operations, at block 1106, the background reader 1004 of keyframe synthesizer 1002 selects and reads one of the compressed video streams in store 304. At block 1108, non-keyframes of the compressed video stream are passed to background decoder 1006. The decoder state is built up in the background decoder 1006 as frames are decoded.

At block 1110, decoder states 310 of the background decoder 1006 are occasionally captured. The decoder state may represent the exact state of the decoder after decoding a corresponding frame, or it may represent a decoder state that will allow decoding to resume at or near the corresponding frame when the state is reloaded into the decoder. The decoder state may be taken after decoding each frame, or on a less frequent basis. As one example, the decoder state is for every $N^{th}$ frames (e.g., N=30). At block 1112, the decoder state is stored in the state index 312, or other storage location. The decoder state is preferably stored in association with the frame that the decoder just decoded, or will be decoding immediately next, when the state was captured. This association may be accomplished via a table structure, pointers, or some other indexing technique.

With respect to the playback operations, at block 1120, the playback reader 314 accesses a requested digital video stream in store 304 and reads the frames beginning at a point where playback is requested. The accessed frame is passed to the playback decoder 316. At block 1122, the decoder state associated with the accessed frame is loaded from the state index 312 into the playback decoder 316. This state sets the playback decoder to essentially the same state it would have built up by decoding preceding frames in the video stream.

At block 1124, the playback recorder 316 either outputs the frame without further decoding (e.g., in the case where the state was captured just after decoding the associated frame) or decodes the accessed frame using the decoder state to produce a completely specified image that can be rendered (e.g., in the case where the state was captured just prior to decoding the associated frame). At block 1126, the decoded frame is passed to renderer 318 for rendering and display to the user. It is noted that the frame from which playback is requested may not have a corresponding decoder state in the state index. In this situation, the reader may access a preceding frame that has an associated decoder state and begin decoding at that point. The recorder could then continue decoding frame-by-frame until reaching the requested frame. Once the requested frame is decoded, it can be output for rendering and display.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A digital video recorder, comprising:
   a store to record a digital video stream having encoded frames;
   a first decoder to decode the frames of the digital video stream in a playback mode, wherein the first decoder captures various decoder states during decoding of the frames, wherein a decoder state contains sufficient data to render a full and complete digital image associated with a particular frame and the decoder state is associated with the particular frame; and
   a keyframe synthesizer, configured to synthesize keyframes, the keyframes having sufficient data to render a complete digital image for use in normal playback and accelerated playback of the digital video stream, and configured to operate in a background mode with respect to the playback mode, the keyframe synthesizer comprising:
      a state index to store the decoder states, wherein the state index employs lossy compression to store the decoder states;
      a reader to read the digital video stream from the store; and
      a second decoder to decode the frames of the digital video stream read by the reader;
   wherein, when the digital video recorder is requested to begin at a particular frame in the video stream, the second decoder is loaded with the decoder state associated with the particular frame to enable the second decoder to resume decoding at the particular frame.

2. A digital video recorder as recited in claim 1, wherein the first and second decoders are implemented as a single decoder.

3. A digital video recorder as recited in claim 1, wherein the first decoder outputs a decoder state for every Nth frame of the digital video stream.

4. A digital video recorder as recited in claim 1, wherein, when the digital video recorder is requested to begin at a particular frame in the video stream that does not have an associated decoder state, the second decoder is loaded with a decoder state associated with a proximal frame preceding the particular frame and begins decoding at the proximal frame using the decoder state associated with the proximal frame.

5. A computer-implemented method comprising:
   recording a digital video stream having encoded frames in a store;
   decoding the frames of the digital video stream in a playback mode by operation of a first decoder, wherein the first decoder captures decoder states during decoding of the frames, wherein a decoder state contains sufficient data to render a complete digital image associated with a particular frame and the decoder state is associated with the particular frame; and
   synthesizing keyframes, the keyframes having sufficient data to render a complete digital image for use in normal playback and accelerated playback of the digital video stream, and configured to operate in a background mode with respect to the playback mode, the synthesizing of keyframes comprising:
      storing the decoder states in a state index, wherein the state index employs lossy compression to store the decoder states;
      reading the digital video stream from the store by operation of a reader; and
      decoding, by operation of a second decoder, the frames of the digital video stream read by the reader;
   wherein, in response to a request to begin decoding at a particular frame in the digital video stream, the second decoder is loaded with a decoder state associated with the particular frame to enable the second decoder to resume decoding at the particular frame.

6. The computer-implemented method as recited in claim 5, wherein the first and second decoders are implemented as a single decoder.

7. The computer-implemented method as recited in claim 5, wherein the first decoder outputs a decoder state for every Nth frame of the digital video stream.

8. The computer-implemented method as recited in claim 5, wherein, when a digital video recorder is requested to begin at a particular frame in the video stream that does not have an associated decoder state, the second decoder is loaded with a decoder state associated with a proximal frame preceding the particular frame and begins decoding at the proximal frame using the decoder state associated with the proximal frame.

9. A method of operating a digital video recorder comprising:
   recording a digital video stream having encoded frames in a store;
   decoding the frames of the digital video stream in a playback mode by operation of a first decoder, wherein the first decoder captures decoder states during decoding of the frames, wherein a decoder state contains sufficient data to render a complete digital image associated with a particular frame and the decoder state is associated with the particular frame; and
   synthesizing keyframes, the keyframes having sufficient data to render a complete digital image for use in normal playback and accelerated playback of the digital video stream, and configured to operate in a background mode with respect to the playback mode, the synthesizing of keyframes comprising:
      storing the decoder states in a state index, wherein the state index employs lossy compression to store the decoder states;
      reading the digital video stream from the store by operation of a reader; and
      decoding, by operation of a second decoder, the frames of the digital video stream read by the reader; wherein, in response to a request to begin decoding at a particular frame in the digital video stream, the second decoder is loaded with a decoder state associated with the particular frame to enable the second decoder to resume decoding at the particular frame.

10. The method as recited in claim 9, wherein the first and second decoders are implemented as a single decoder.

11. The method as recited in claim 9, wherein the first decoder outputs a decoder state for every Nth frame of the digital video stream.

12. The method as recited in claim 9, wherein, when a digital video recorder is requested to begin at a particular frame in the video stream that does not have an associated decoder state, the second decoder is loaded with a decoder state associated with a proximal frame preceding the particular frame and begins decoding at the proximal frame using the decoder state associated with the proximal frame.

* * * * *